(12) United States Patent
Martin

(10) Patent No.: US 8,087,858 B2
(45) Date of Patent: Jan. 3, 2012

(54) VISE-MOUNTED MILLING MACHINE COLLET INDEXER

(75) Inventor: Joseph H. Martin, Vista, CA (US)

(73) Assignee: Sherline Products Inc., Vista, CA (US)

( * ) Notice: Subject to any disclaimer, the term of this patent is extended or adjusted under 35 U.S.C. 154(b) by 665 days.

(21) Appl. No.: 10/726,223

(22) Filed: Dec. 1, 2003

(65) Prior Publication Data

US 2005/0117986 A1    Jun. 2, 2005

(51) Int. Cl.
*B23C 1/14* (2006.01)
*B23Q 16/02* (2006.01)
*B23Q 16/06* (2006.01)

(52) U.S. Cl. ............ 409/221; 409/165; 269/63; 269/71; 74/813 R

(58) Field of Classification Search .................. 409/198, 409/221, 224, 225, 164–165, 168, 174, 205, 409/219, 222–223, 240; 269/63, 61, 65, 269/73, 81, 71; 74/813 R, 813 L, 827; 408/71; 29/27 C, 27 R
See application file for complete search history.

(56) References Cited

U.S. PATENT DOCUMENTS

| | | | | | |
|---|---|---|---|---|---|
| 1,946,835 | A | * | 2/1934 | Buhr | 269/70 |
| 2,406,906 | A | * | 9/1946 | Saunders | 409/221 |
| 2,716,911 | A | * | 9/1955 | Focke | 269/85 |
| 4,153,239 | A | * | 5/1979 | La Rocco | 269/287 |
| 4,353,271 | A | * | 10/1982 | Pieczulewski | 74/813 L |
| 4,502,457 | A | * | 3/1985 | Marron | 269/71 |
| 4,678,381 | A | * | 7/1987 | Bailey | 409/221 |
| 4,684,114 | A | * | 8/1987 | Bell, Sr. | 269/57 |
| 4,750,722 | A | * | 6/1988 | Chick | 269/110 |
| 4,899,998 | A | * | 2/1990 | Teramachi | 269/63 |
| 5,462,294 | A | * | 10/1995 | Wendhack | 269/88 |
| 5,482,300 | A | * | 1/1996 | Wendhack | 269/88 |
| 6,149,358 | A | * | 11/2000 | Montague | 409/225 |

FOREIGN PATENT DOCUMENTS

DE    122488 A    * 10/1976

* cited by examiner

*Primary Examiner* — Erica E Cadugan

(57) ABSTRACT

An instantly aligning collet indexer that can be instantly mounted on the standard tooling vises found on most milling machines. A constant clamping pneumatic collet closing system with the valve and manifold is built into the body. The design is compact enough to fit in any standard 6" machine tool vise and rigid enough to be useful for machining operations. The collet indexer can be used in a vertical or horizontal position in a typical mill vise of a milling machine. The device can be driven by a simple graduated hand crank or by a servo type motor controlled by various programs used in conjunction with a computer.

7 Claims, 5 Drawing Sheets

VISE-MOUNTED MILLING MACHINE COLLET INDEXER

BACKGROUND OF THE INVENTION

1. Field of the Invention

The present invention relates to collet indexers for milling machines and in particular to a collet indexer mounted on a block which fits into a standard milling machine vise vertically and horizontally, the indexer having a pneumatic chuck control and either a hand crank or programmable index control.

2. Description of the Prior Art

The machining of components often requires the cutting down of surfaces and then the drilling or working of other features into the work piece. Perhaps one of the most useful machining devices for working articles from metal, wood, or other raw material, is the use of a mill. An important milling device is the vertical mill, which includes a table on which a work piece is mounted as the mill is brought down to machine the desired features on the work piece.

An important factor to consider while using a mill or other machining equipment is the time required to set up the machinery to support the work piece at a desired position so that it can receive the mill tool and allow machining of the surfaces of the work piece. Also of importance is the fact that if a particular operation cannot be carried out with a specific piece of equipment, a suitable machine must be found. This can be a problem in a machine shop where equipment is assigned for specific jobs, and the set-up and take-down times can play important roles in selecting when a particular piece of equipment is used to machine a particular work piece.

Many prior art devices are very large expensive indexers that have to be mounted as stand alone units.

U.S. Pat. No. 5,462,294, issued Oct. 31, 1995 to Wendhack, provides an adapter for converting a standard machine vise into a set-up orthogonal collet fixture. The adapter includes front and back members that bolt to the vise jaws after the vise jaw plates have been removed, an internally tapered sleeve in the back member for engaging a taper on a standard 5C Collet, a take-up nut seated in the same member for engaging threads on the end of the collet to hold the collet, and a cam for moving the sleeve relative to the collet as the vise is closed causing the front member to move toward the back member pulling or pushing the sleeve over the collet thereby causing the collet to clamp the workpiece.

U.S. Pat. No. 5,482,300, issued Jan. 9, 1996 to Wendhack, shows an adapter for converting a standard machine vise into a set-up collet fixture. The adapter includes front and back supports that bolt to the vise jaws after the vise jaw plates have been removed, an internally tapered sleeve in the supports for engaging a taper on a standard 5C collet, and a take-up nut seated in the back support for engaging threads on the end of the collet to hold the collet stationary to the vise as the vise is opened causing the front support to move away from the back support pulling the sleeve over the stationary collet thereby causing the collet to clamp the workpiece.

U.S. Pat. No. 4,502,457, issued Mar. 5, 1985 to Marron, discloses an improved universal multiple angle work piece holder which is capable of setting an object at any desired compound angle so that the object may be machined at any desired location. The invention further relates to an apparatus which can be securely adjusted in a manner that provides a firm support for the object to be machined and provides an angle adjustment design which allows the object to be machined to be adjacent the center lines of the universal multiple angle work piece holder. The present invention also relates to a tool which can easily be converted into other useful tools such as an indexing head to set a work piece at standard angles, a collet holder for use with machines such as a vertical milling machine or a surface grinder, or a dresser for use with a grinding wheel.

U.S. Pat. No. 4,678,381, issued Jul. 7, 1987 to Bailey, indicates a Portable Machining Turntable (PMT) that is used in combination with a milling, grinding or drilling machines to allow both single and compound angles to be worked. The PMT is comprised of an integral housing that encloses an electric stepping motor that through two pulleys and a timing belt drives a worm drive assembly. The worm drives a worm gear that rotates a rotary head. The power to operate the motor is supplied and controlled by a conventional numerical control system. However, the PMT includes a mechanical override that allows the rotary head to be manually rotated. To operate the PMT it is mounted to a mill bed by standard clamp blocks inserted into hold-down slots located on the lower walls of the housing. The work piece is then attached to the rotary head and the head is rotated to the desired work angle. If compound angles are required the PMT is secured to standard machine vise, attached to the mill bed, and positioned within the vise to provide the first angle. The second angle is then produced by rotating the rotary head in the prescribed manner.

U.S. Pat. No. 4,750,722, issued Jun. 14, 1988 to Chick, discloses a workpiece that can be rapidly located with respect to three mutually perpendicular datum planes by positioning it within both a main machine vise and a supplemental machine vise held within the main machine vise. The supplemental machine vise being one that has an overall length extending beyond the grip of the main machine vise, ground and polished planar side surfaces adapted to be positioned so that one of them is in contact with the substantially planar ground and polished bed surface of the main machine vise, and a ground and polished substantially planar base surface on the supplemental vise, which is adapted to be abutted, usually but not necessarily in a vertical position, against the working interior face of the fixed jaw of the main machine vise. The supplemental vise may be either secured to the fixed jaw in the same manner that its removable jaw plate would be, if it were present, or by bolting or otherwise securing it to a retainer member located exteriorly of the fixed jaw of the main machine vise.

U.S. Pat. No. 4,969,637, issued Nov. 13, 1990 to Nishimura, indicates a work holder for a vice in a machine tool, in which by means of a holder body attached removably to a fixed jaw of the vice and a clamp block and a clamp screw both attached to the holder body, a work whose side faces have already been machined is fixed temporarily in an exact vertical posture and then fixed completely by the vice so that the side faces thereof are set exactly at right angles to permit machining for the top face of the work.

What is needed is an inexpensive and instantly aligning collet indexer that can be instantly mounted on the standard tooling vise found mounted on the milling machines used by small and large machine shops throughout the world.

SUMMARY OF THE INVENTION

An object of the present invention is to provide an inexpensive and instantly aligning collet indexer that can be instantly mounted on the standard tooling vise found mounted on 95% the milling machines used by small and large machine shops throughout the world.

Another object of the present invention is to provide a device that instantly aligns in the standard vise, which allows it to be used quickly and efficiently for the smallest jobs, eliminating the hours of set-up time normally required.

One more object of the present invention is to provide an instantly-aligning collet indexer that lowers manufacturing cost because of its simplicity.

An additional object of the present invention is to incorporate a pneumatic collet closing system with the valve and manifold built into the body. This keeps the operation of the collet simple, compact and easy and quick to use, while simulating the action of a more expensive and elaborate production CNC (Computer Numeric Control) machine.

A further object of the present invention is to provide a pneumatic system that also has the advantage of controlling a constant clamping force as the diameter of the work varies within the range of the collet.

A contributory object of the present invention is to provide a design that is compact enough to fit in any standard 6" machine tool vise.

Another object of the present invention is to provide a design rigid enough to be useful for machining operation and still have a pneumatic collet operation.

An added object of the present invention is to provide a spindle that is driven by a 72-tooth worm gear, which is driven by a worm. The 72-tooth gear provides increased accuracy of the device, because one revolution of the worm equals 5 degrees of spindle rotation.

An ensuing object of the present invention is to provide a device in which the worm can be driven by a simple graduated hand crank or by a servo type motor controlled various programs used in conjunction with a computer. This allows precise movement of the spindle.

In brief, the present invention provides an instantly aligning collet indexer. The device can be instantly mounted on the standard tooling vise that you will find mounted on 95% of the milling machines used by small and large machine shops throughout the world. The design of the collet indexer allows it to be used quickly and efficiently for the smallest jobs. The design also lowers manufacturing cost because of its simplicity. The device incorporates a pneumatic collet closing system with the valve and manifold built into the body keeping the operation of the collet simple, compact and easy and quick to use. The pneumatic system also has the advantage of controlling a constant clamping force as the diameter of the work varies within the range of the collet, which adds to the overall design. The design, which includes a pneumatic collet operation, is compact enough to fit in any standard 6" machine tool vise and rigid enough to be useful for machining operation.

The collet indexer of the present invention is used on a milling machine and can be held horizontally or vertically in a typical mill vise. In the horizontal position the raw material is inserted into the collet under the milling cutter. Activating the pneumatic closing system pulls the collet into a taper, closing it on the part to hold it for cutting. The CNC-controlled stepper motor then rotates the part as needed for milling or drilling radial hole patterns. Releasing the pneumatic actuator allows the finished part to be removed. The collet indexer of the present invention can be held vertically in the same vise for machining operations around the outside edge of a part also held in the collet. In this position a series of flats (like a hex head) could be machined onto a part of a series of holes could be drilled from the side.

The 5C collet size was chosen because of the popularity of this particular collet throughout the world. The spindle is driven, preferably, by a 72-tooth worm gear, which is in turn driven by a worm. The 72-tooth gear was chosen because one revolution of the worm equals 5 degrees of spindle rotation increasing the accuracy of the device. The worm can be driven by a simple graduated hand crank or by a servo type motor controlled various programs used in conjunction with a computer. This allows precise movement of the spindle.

Over the years there have been many variations of rotary indexing fixtures, but never one that is designed to take advantage of the tooling that is presently mounted on 95% of the milling machines in use.

An advantage of the present invention is a design that may be used with the tooling that is presently mounted on most of the milling machines in use.

Another advantage of the present invention is that it allows for precise movement of the spindle.

A corollary advantage of the present invention is that it provides a constant clamping force as the diameter of the work varies.

An additional advantage of the present invention is that it employs a quick release for the pneumatic collet operation.

One more advantage of the present invention is that it provides a popular collet size.

Yet another advantage of the present invention is that it may be used in a vertical or horizontal position.

Still another advantage of the present invention is in being compact enough to fit in any standard 6" machine tool vise.

Yet another advantage of the present invention is that it allows for instant alignment.

A further advantage of the present invention is that the worm can be driven by a simple graduated hand crank or by a servo type motor controlled various programs used in conjunction with a computer.

A final advantage of the present invention is that it lowers manufacturing cost because of its simplicity.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 2:
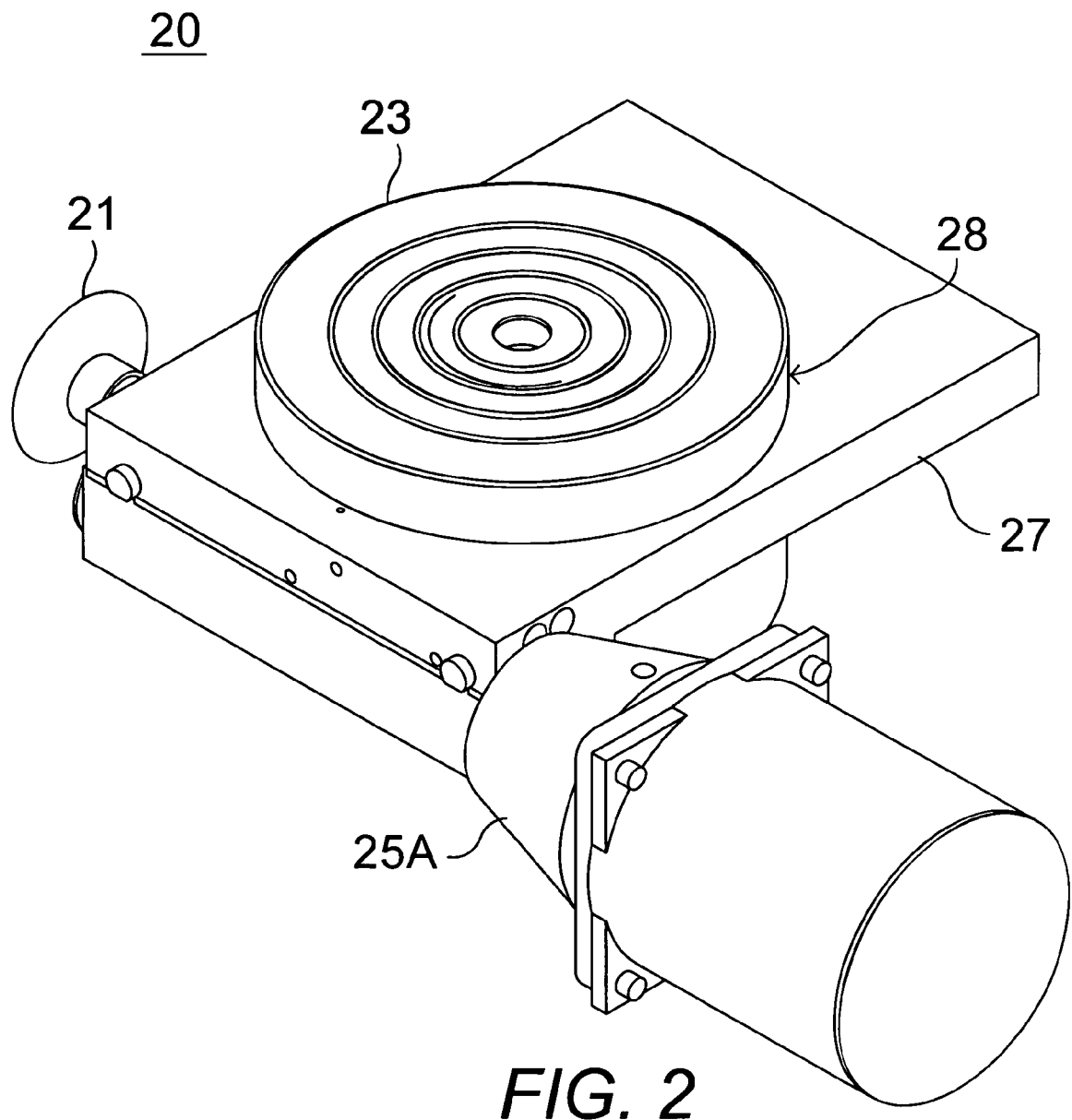
FIG. 2 is a perspective view of the block mounted collet indexer of the present invention in a horizontal position showing the front circular plate to hold the brackets for holding the work piece, and having a computerized control for turning the work piece.
Figure 3:
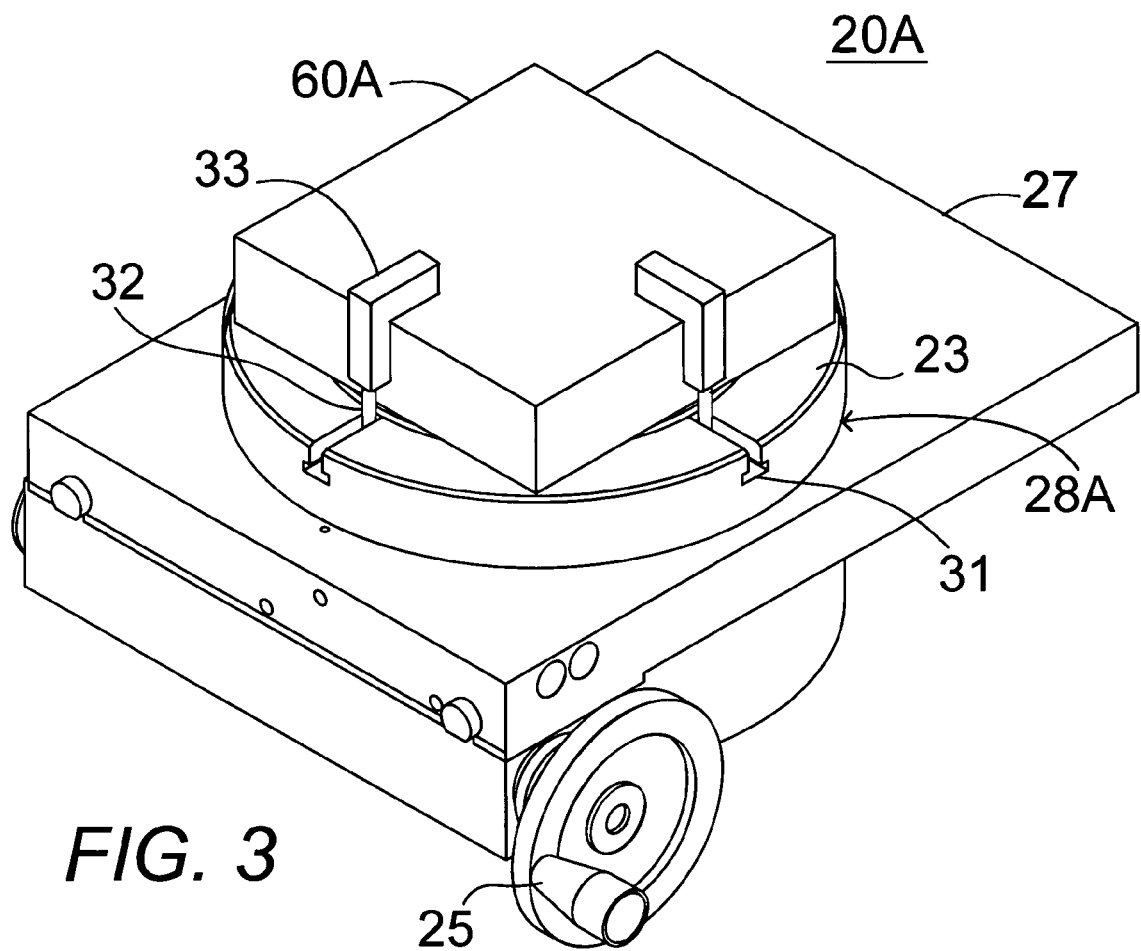
FIG. 3 is a perspective view of the block mounted collet indexer of the present invention in a horizontal position showing the front circular plate with the brackets for holding the work piece, and having a hand crank for turning the work piece.
Figure 4:
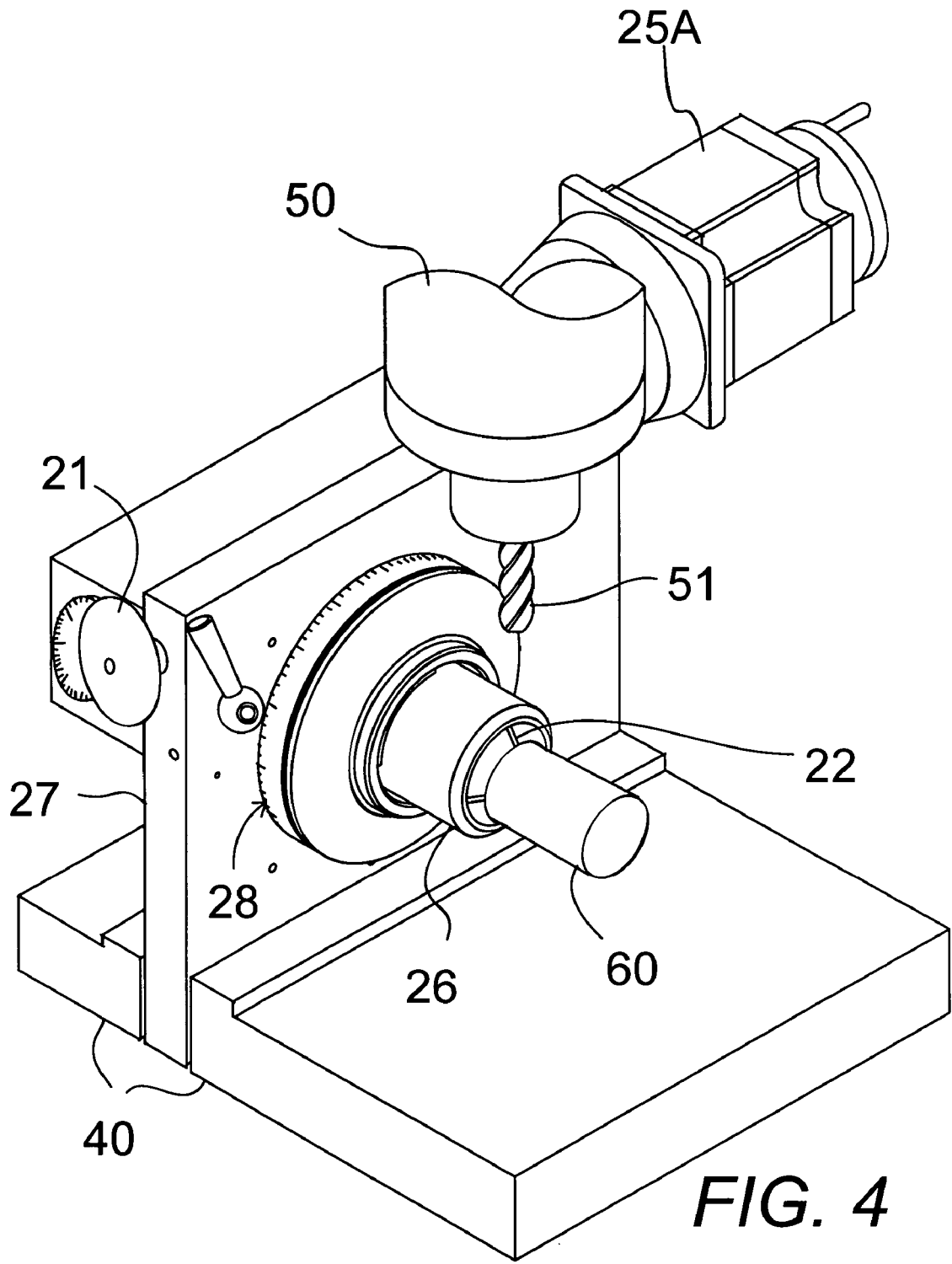
FIG. 4 is a perspective view of the block mounted collet indexer of the present invention mounted in a vertical position in a vise on a milling machine, showing the front cylinder and chuck holding the work piece, and having a computerized control for turning the work piece and a pneumatic control for the chuck.
Figure 5:
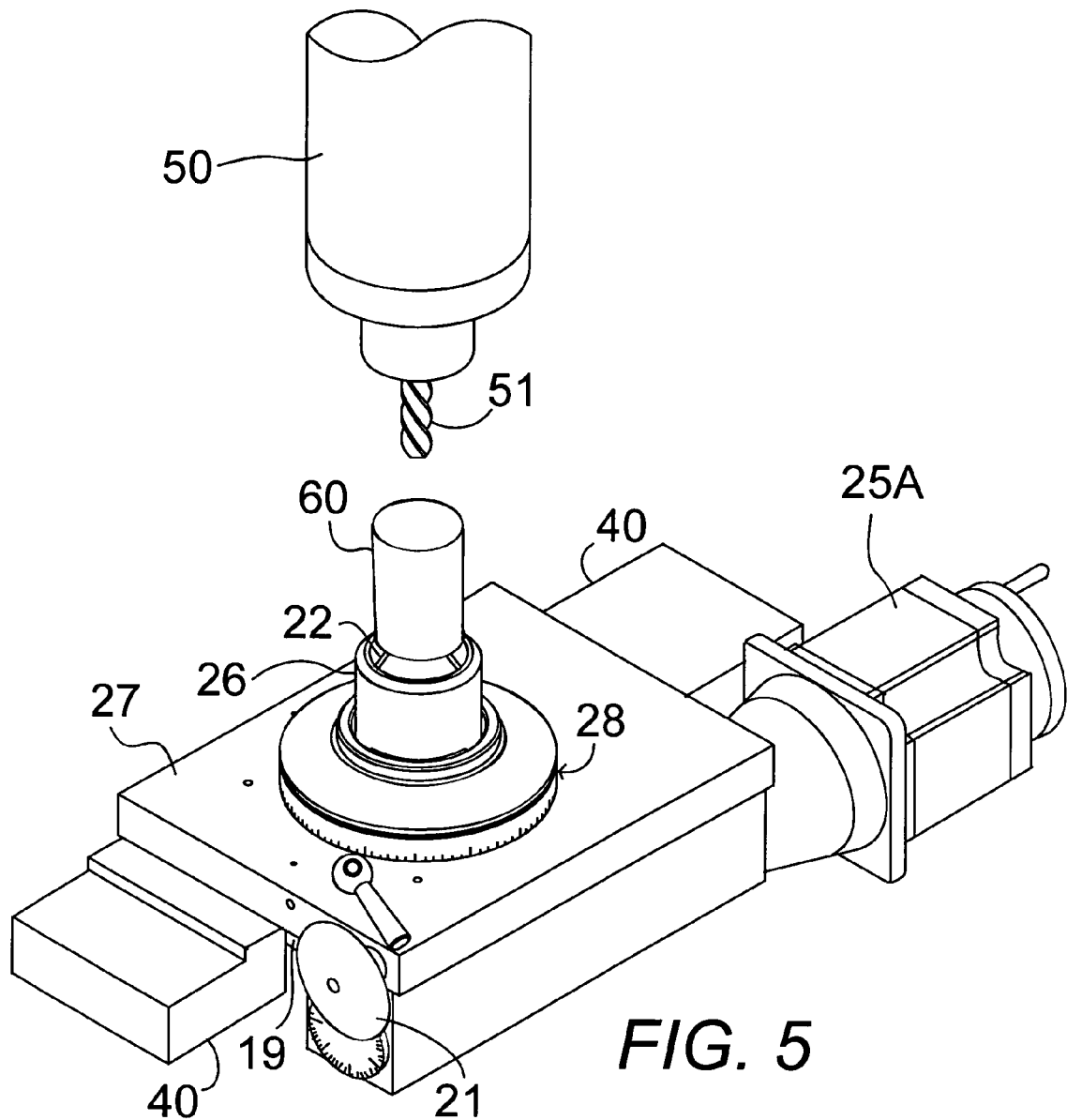
FIG. 5 is a perspective view of the block mounted collet indexer of the present invention mounted in a horizontal position in a vise on a milling machine, showing the front cylinder and chuck holding the work piece, and having a computerized control for turning the work piece and a pneumatic control for the chuck.

In FIGS. 1-5, a collet indexer device 20 and 20A is shown that is instantly mountable and alignable in a vise 40 on a standard milling machine 50. The device 20 and 20A comprises a metal block 27 that has at least two opposing parallel faces capable of being held in a vise 40 on a standard milling machine 50 with the block 27 held in a vertical position, as shown in FIG. 4. The block 27 also has at least two opposing parallel faces, each having an aligning groove 19, the faces capable of being held in a vise 40 on a standard milling machine 50 with the block 27 held in a horizontal position, as shown in FIG. 5. The metal block 27 is sized to fit in any standard six-inch machine tool vise 40.

The device 20 and 20A also comprises work-holding element 28 and 28A rotatably mounted on a face of the block 27 by a rotatable plate 23 means. The rotatable plate 23 comprises a spindle (not shown) that is capable of being driven by a seventy-two tooth worm gear (not shown) which in turn is driven by a worm so that one revolution of the worm equals five degrees of spindle rotation. The work holding element 28 is capable of holding a work piece 60 with the block 27 in either the vertical (shown in FIG. 4) or horizontal position (shown in FIG. 5).

The work holding element 28 comprises a chuck 22 mounted in a rotatable cylinder 26, as shown in FIGS. 4 and 5. The device 20 also comprises a means for controlling the mounting of the work piece 60 on the work holding element 28 and the removal of the work piece 60 from the work holding element 28. The means for controlling the mounting and the removal of the work piece 60 comprises a pneumatic control 21, which enables instant mounting and removal. In a further embodiment 20A, shown in FIG. 3, the work holding element 28A comprises a rotatable plate 23 that has a series of radial slots 31 around the plate 23 and removable brackets 33 adjustably mounted in the slots 31 for holding the work piece 60A.

Figure 1:
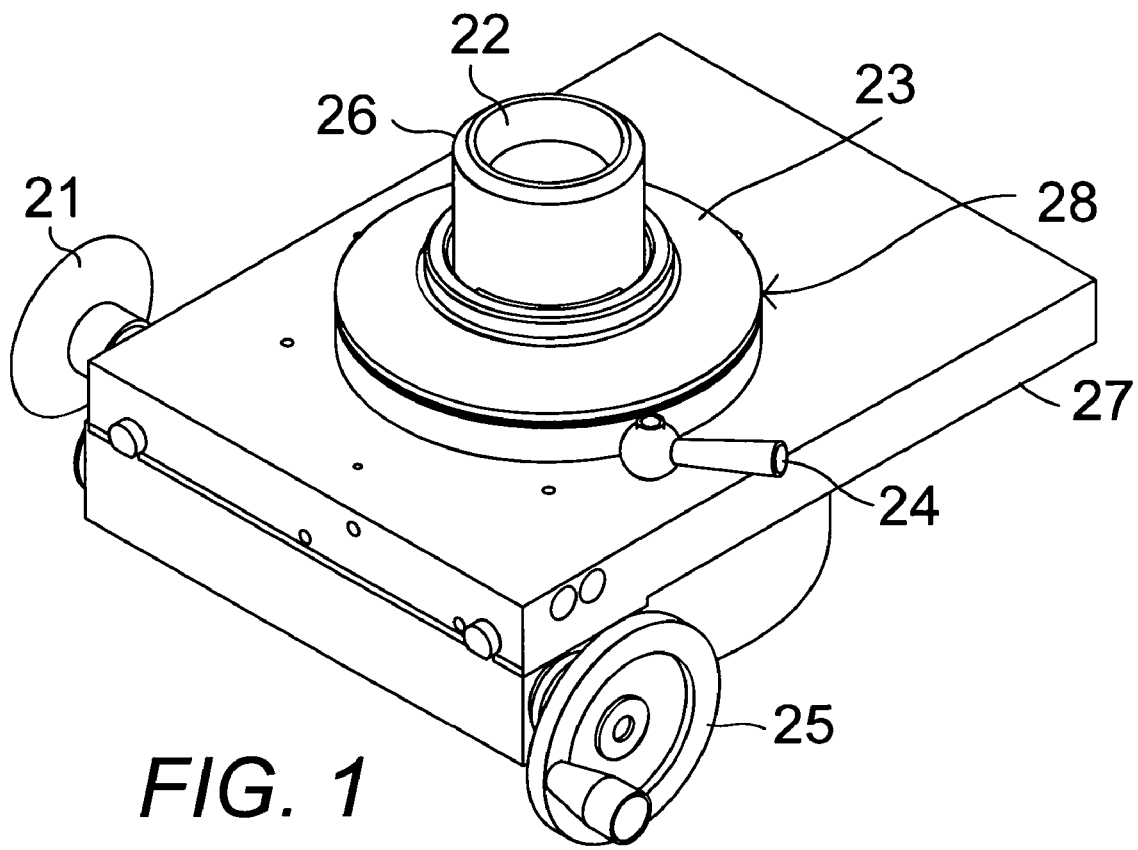
FIG. 1 is a perspective view of the block mounted collet indexer of the present invention in a horizontal position showing the front cylinder used to hold the chuck for holding the work piece, and having a hand crank for turning the work piece and a pneumatic control for the chuck.

The device 20 further comprises a control means for rotating the work holding element 28 and 28A to specific desired points of rotation so the milling machine 50 can machine the work piece 60 or 60A. The control means for rotating the work holding element 28 or 28A to specific desired points of rotation may comprise a hand crank 25 for turning the work holding element 28 or 28A, as shown in FIGS. 1 and 3, or a computerized control 25A for turning the work holding element 28, as shown in FIGS. 2, 4 and 5.

In practice, the user would place the metal block 27 of the collet indexer 20 in any standard six-inch machine tool vise 40 on a standard milling machine 50. The block 27 could be set up with at least two opposing parallel faces capable of being held in a vise 40 on a standard milling machine 50 with the block 27 held in a horizontal position, as shown in FIG. 5. In the horizontal position the raw material 60 is inserted into the chuck 22 of the rotatable cylinder 26 under the milling cutter 51. Activating the pneumatic closing system 21 pulls the chuck 22 into a taper, closing it on the part 60 to hold it for cutting. The CNC-controlled stepped motor 25A then rotates the part 60 as needed for milling or drilling radial hole patterns. Releasing the pneumatic actuator 21 allows the finished part 60 to be removed. The finished part 60 may also be removed by use of the quick release handle 24.

The block 27 of the collet indexer 20 could alternately be set up with at least two opposing parallel faces capable of being held in a vise on a standard milling machine 50 with the block 27 held vertically in the same vise 40. The vertical position, shown in FIG. 4 would be used for machining operations around the outside edge of a part 60 held in the chuck 22 of the rotatable cylinder 26. In this position a series of flats (like a hex head) could be machined onto a part 60 or a series of holes could be drilled from the side.

In a further embodiment 20A, shown in FIG. 3 the work holding element 28A comprises a rotatable plate 23 that has a series of radial slots 31 around the plate 23 and removable brackets 33 adjustably mounted in the slots 31. The user would adjust the brackets 33 to hold or release the work piece 60A.

In operation the spindle (not shown) of the rotatable plate 23 is driven, preferably, by a seventy-two tooth worm gear (not shown) which is driven by a worm so that one revolution of the worm equals five degrees of spindle rotation. The work holding element may 28 or 28A be rotated to specific desired points by operating a hand crank 25, as shown in FIGS. 1 and 3, or a computerized control 25A for turning the work holding element 28, as shown in FIGS. 2, 4 and 5.

It is understood that the preceding description is given merely by way of illustration and not in limitation of the invention and that various modifications may be made thereto without departing from the spirit of the invention as claimed.

What is claimed is:

1. A collet indexer device instantly mountable and alignable in a vise on a standard milling machine alternately in a vertical orientation for indexing a work piece via an index control means about a horizontal axis and a horizontal orientation for indexing the work piece via the index control means about a vertical axis, the device comprising:

a metal block having at least two opposing outer first parallel faces of the metal block for holding the metal block in a vise on a standard milling machine with a pair of jaws of the vise gripping the outer parallel faces so that the block is held in the vertical orientation and at least two further opposing parallel outer faces on opposite sides of the metal block, both orthogonal to the first faces, for holding the metal block in the vise on the standard milling machine with the pair of jaws of the vise alternately gripping the further outer parallel faces so that the block is held in the horizontal orientation;

a work holding element rotatably mounted on a face of the block by a rotatable means, the work holding element holding a work piece with the block alternately in both the vertical orientation and the horizontal orientation;

the index control means, being for rotating the work holding element to specific desired points of rotation so that the work piece can be machined by the milling machine;

a chuck control means for controlling the clamping of the work piece on the work holding element and the unclamping of the work piece from the work holding element;

the block including means for instantly aligning the block in the vise in the horizontal orientation.

2. The device of claim 1 wherein the work holding element comprises a chuck mounted in a rotatable cylinder.

3. The device of claim 2 wherein the means for controlling the clamping and the unclamping of the work piece comprises a pneumatic control enabling instant clamping and unclamping of the work piece.

4. The device of claim 1 wherein the work holding element comprises a rotatable circular plate having a series of radial slots radiating out from a center of the circular plate around the plate and removable brackets adjustably mounted in the slots for holding the work piece.

5. The device of claim 1 wherein the control means for rotating the work holding element to specific desired points of rotation comprises a hand crank for turning the work holding element.

6. The device of claim 1 wherein the control means for rotating the work holding element to specific desired points of rotation comprises a computerized control for turning the work holding element.

7. The device of claim 1 wherein the metal block is sized to fit in any standard six inch machine tool vise.

\* \* \* \* \*